(12) United States Patent
Rice et al.

(10) Patent No.: US 10,151,214 B2
(45) Date of Patent: Dec. 11, 2018

(54) INTEGRAL INSTRUMENTATION IN ADDITIVELY MANUFACTURED COMPONENTS OF GAS TURBINE ENGINES

(71) Applicant: United Technologies Corporation, Farmington, CT (US)

(72) Inventors: William W. Rice, South Glastonbury, CT (US); Michael Ian Walker, Glastonbury, CT (US); Douglas H. Thomesen, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 217 days.

(21) Appl. No.: 15/114,013

(22) PCT Filed: Jan. 23, 2015

(86) PCT No.: PCT/US2015/012708
§ 371 (c)(1),
(2) Date: Jul. 25, 2016

(87) PCT Pub. No.: WO2015/119792
PCT Pub. Date: Aug. 13, 2015

(65) Prior Publication Data
US 2016/0348531 A1 Dec. 1, 2016

Related U.S. Application Data

(60) Provisional application No. 61/936,032, filed on Feb. 5, 2014.

(51) Int. Cl.
F01D 17/04 (2006.01)
F01D 17/08 (2006.01)
(Continued)

(52) U.S. Cl.
CPC .......... *F01D 21/003* (2013.01); *B22F 3/1055* (2013.01); *B22F 5/009* (2013.01);
(Continued)

(58) Field of Classification Search
CPC .......... B22F 3/1055; B22F 5/009; B22F 5/04; B33Y 10/00; B33Y 80/00; F01D 17/04;
(Continued)

(56) References Cited

U.S. PATENT DOCUMENTS 4,433,584 A * 2/1984 Kokoszka ............... G01P 5/175
73/861.66
4,605,315 A 8/1986 Kokoszka et al.
(Continued)

FOREIGN PATENT DOCUMENTS

DE 102008025869 A1 12/2009
EP 0298012 A1 1/1989
(Continued)

OTHER PUBLICATIONS

Extended European Search Report, for European Patent Application No. 15746520.4, dated Apr. 28, 2017, 10 pages.
(Continued)

*Primary Examiner* — Nguyen Q. Ha
(74) *Attorney, Agent, or Firm* — Kinney & Lange, P.A.

(57) ABSTRACT

A pressure probe includes a non-deflecting airfoil, a sensing feature, and an interior passage. The non-deflecting airfoil is made of a metal and configured for use in a gas turbine engine. The airfoil extends from a base to a tapered portion, and then to a linear portion, along a primary axis. The sensing feature is formed monolithically with the airfoil, as by additive manufacturing. The interior passage is operatively connected to the sensing feature and passes through both the airfoil and the base.

13 Claims, 6 Drawing Sheets

(51) Int. Cl.
*F02C 7/00* (2006.01)
*G01M 15/14* (2006.01)
*G01P 5/14* (2006.01)
*F01D 21/00* (2006.01)
*G01P 5/175* (2006.01)
*B22F 5/00* (2006.01)
*B22F 3/105* (2006.01)
*B22F 5/04* (2006.01)
*B33Y 10/00* (2015.01)
*B33Y 80/00* (2015.01)

(52) U.S. Cl.
CPC .............. *B22F 5/04* (2013.01); *B33Y 10/00* (2014.12); *B33Y 80/00* (2014.12); *F01D 17/08* (2013.01); *F02C 7/00* (2013.01); *G01M 15/14* (2013.01); *G01P 5/14* (2013.01); *G01P 5/175* (2013.01); *F05D 2220/32* (2013.01); *F05D 2230/22* (2013.01); *F05D 2230/31* (2013.01); *F05D 2250/292* (2013.01); *F05D 2260/83* (2013.01); *F05D 2300/10* (2013.01); *Y02P 10/295* (2015.11); *Y02T 50/672* (2013.01)

(58) Field of Classification Search
CPC .......... F01D 17/06; F01D 17/08; F01D 21/00; F01D 21/03; F01D 21/003; F02C 7/00; F05D 2220/32; F05D 2230/22; F05D 2230/31; F05D 2250/292; F05D 2260/83; F05D 2300/10; G01K 1/14; G01K 1/16; G01M 15/14; G01P 5/14; G01P 5/175; Y02T 50/672

See application file for complete search history.

(56) References Cited

U.S. PATENT DOCUMENTS

| | | |
|---|---|---|
| 4,733,975 A | 3/1988 | Komanetsky et al. |
| 2007/0220984 A1 | 9/2007 | Slagle et al. |
| 2012/0324988 A1 | 12/2012 | Hockaday et al. |

FOREIGN PATENT DOCUMENTS

| | | | | |
|---|---|---|---|---|
| EP | 1637891 A1 | * | 3/2006 | .............. G01P 5/165 |
| FR | 2952713 A1 | * | 5/2011 | .............. F01D 17/08 |
| GB | 2452026 A | | 2/2009 | |

OTHER PUBLICATIONS

Partial European Search Report, for European Patent Application No. 15746520.4, dated Jan. 25, 2017, 6 pages.

International Search Report and Written Opinion from PCT Application Serial No. PCT/US2015/012708, dated Apr. 24, 2015, 14 pages.

* cited by examiner

INTEGRAL INSTRUMENTATION IN ADDITIVELY MANUFACTURED COMPONENTS OF GAS TURBINE ENGINES

BACKGROUND

The described subject matter relates to turbine engines, and more particularly to sensing instrumentation for use in turbine engines.

Gas turbine engines require measurements of operational conditions such as temperature and pressure. Often, the pressure and/or temperature of interest are those within a core airflow. Sensing heads of what are known as "kiel ports" or "kiels" are often used to carry out measurements of these operational conditions. Kiels can be attached to various surfaces throughout a gas turbine engine. Often, kiels are attached to a probe that can be inserted into the core flow. Kiels transmit desired quantities of core air to external sensors. Kiels and associated tubing can undesirably impinge or obstruct the core airflow.

SUMMARY

A pressure probe includes a non-deflecting airfoil that is formed with interior passages connected to monolithically formed sensing features.

DETAILED DESCRIPTION

The structures described herein include tubing built into the body of an airfoil. Furthermore, kiels are built into the airfoil. In this way, there is little or no impingement of core air flow caused by external tubing and kiel constructions, and a large portion of the undesirable drag associated with sensing equipment is eliminated. By additively manufacturing the tubing and the kiels monolithically within the airfoils, multiple tubes can be made. In some cases, it is beneficial to make each tube with an equal length with the others in the airfoil, or kiels that each feed a common internal tube. Kiels can be precisely aligned with the expected direction of the core air flow, and fittings can be eliminated.

Figure 1:
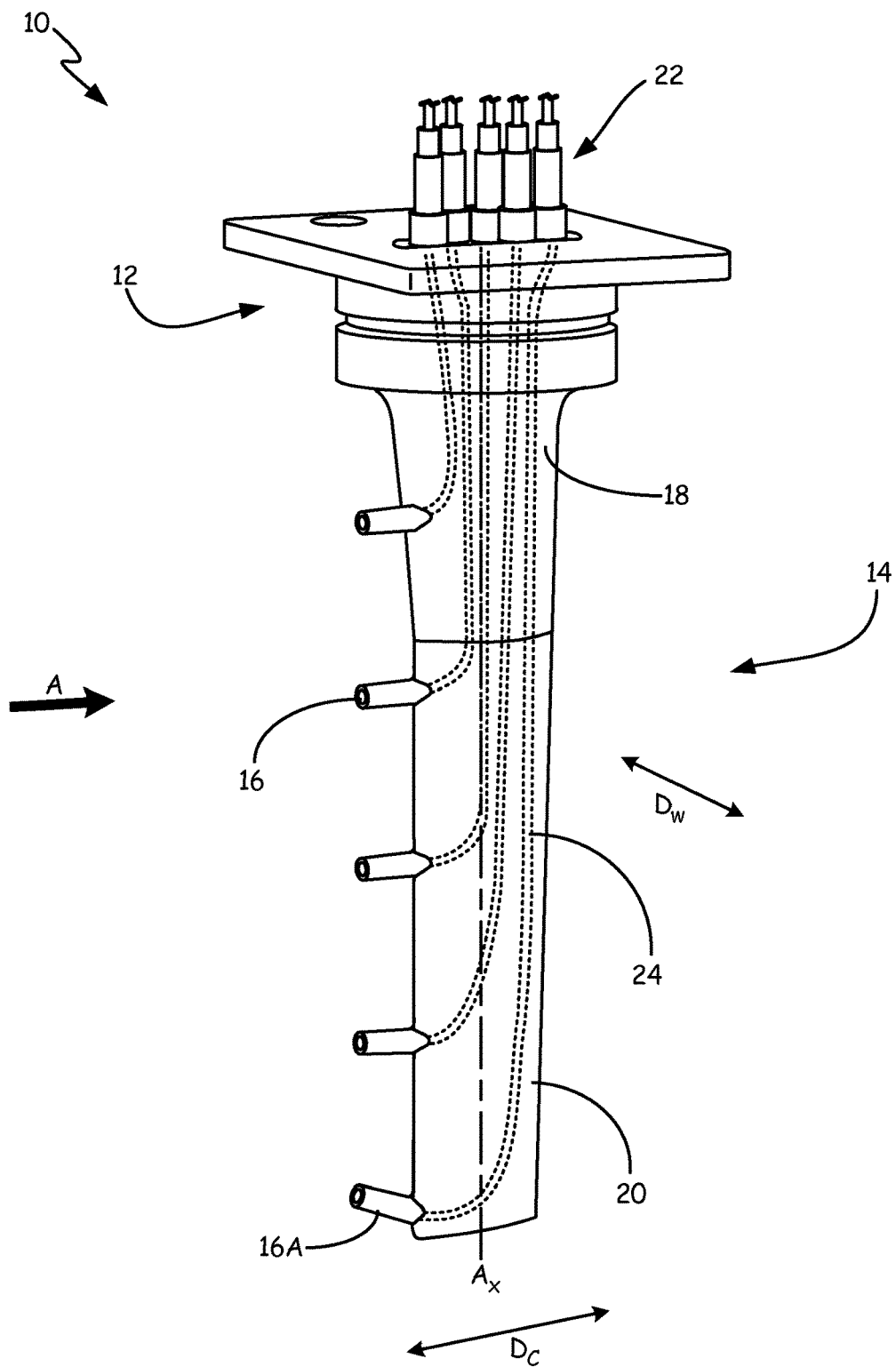
FIG. 1 is a perspective view of a pressure probe, with internal tubing shown in phantom.

FIG. 1 is a perspective view of pressure probe 10. Pressure probe 10 includes base 12, airfoil 14, and kiels 16. Probe body 14 includes transition portion 18 and linear portion 20. Pressure probe 10 is arranged in the path of airstream A. Pressure probe 10 can be used to collect data regarding airstream A. Samples of airstream A may be transferred to remote sensors (not shown) via hypo tubing 22. Kiels 16 can be used to collect samples from airstream A and transmit those samples via internal tubing 24 to hypo tubing 22. Additionally, some data (such as pressure measurements) can be obtained by maintaining a fluid communication path between one of kiels 16 and a remote sensor (not shown), without necessitating routing of samples of airstream A through hypo tubing 22.

Pressure probe 10 may be used in various portions of a gas turbine engine. For example, pressure probe 10 may be configured to be deployed into airstream A that comprises the engine's core air flow. Pressure probe 10 is shaped substantially as an airfoil. However, pressure probe 10 is not designed to deflect airflow. Rather, pressure probe 10 is designed to be non-disruptive to the airstream in which it sits.

Figure 2A:
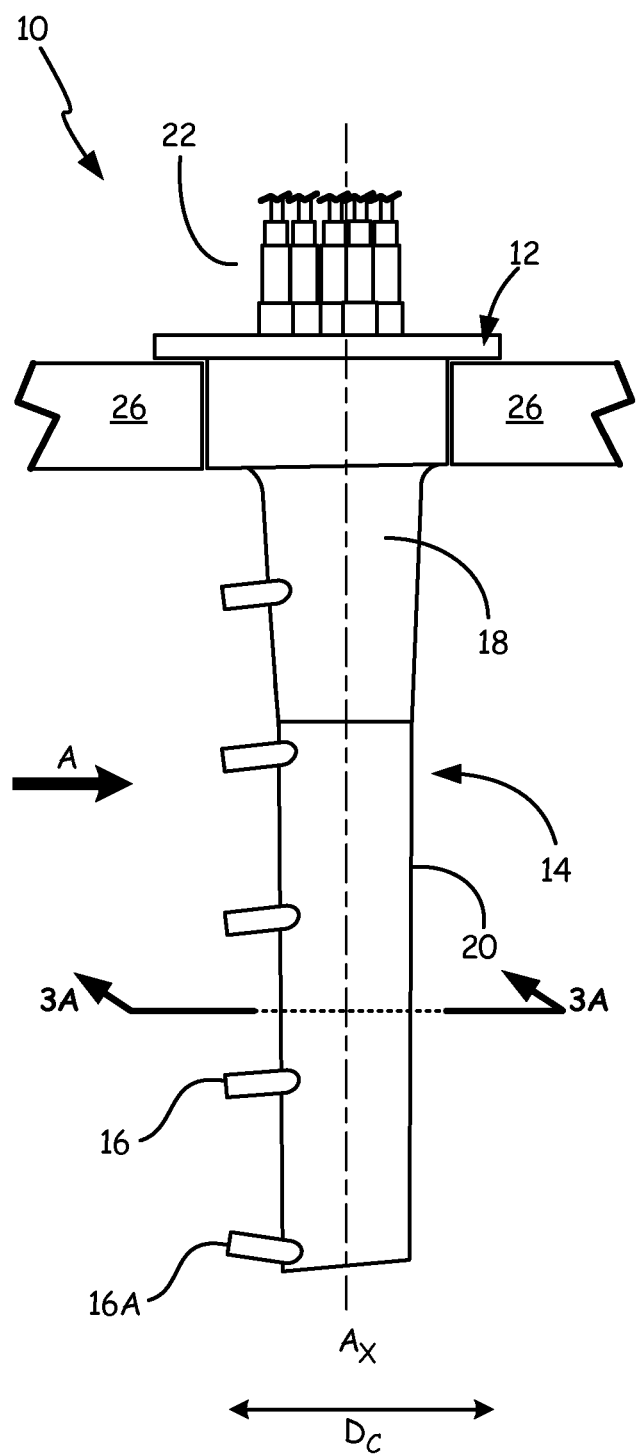
FIGS. 2A-2B are partial cross-sectional views of the pressure probe of FIG. 1 arranged in a duct.
Figure 2B:
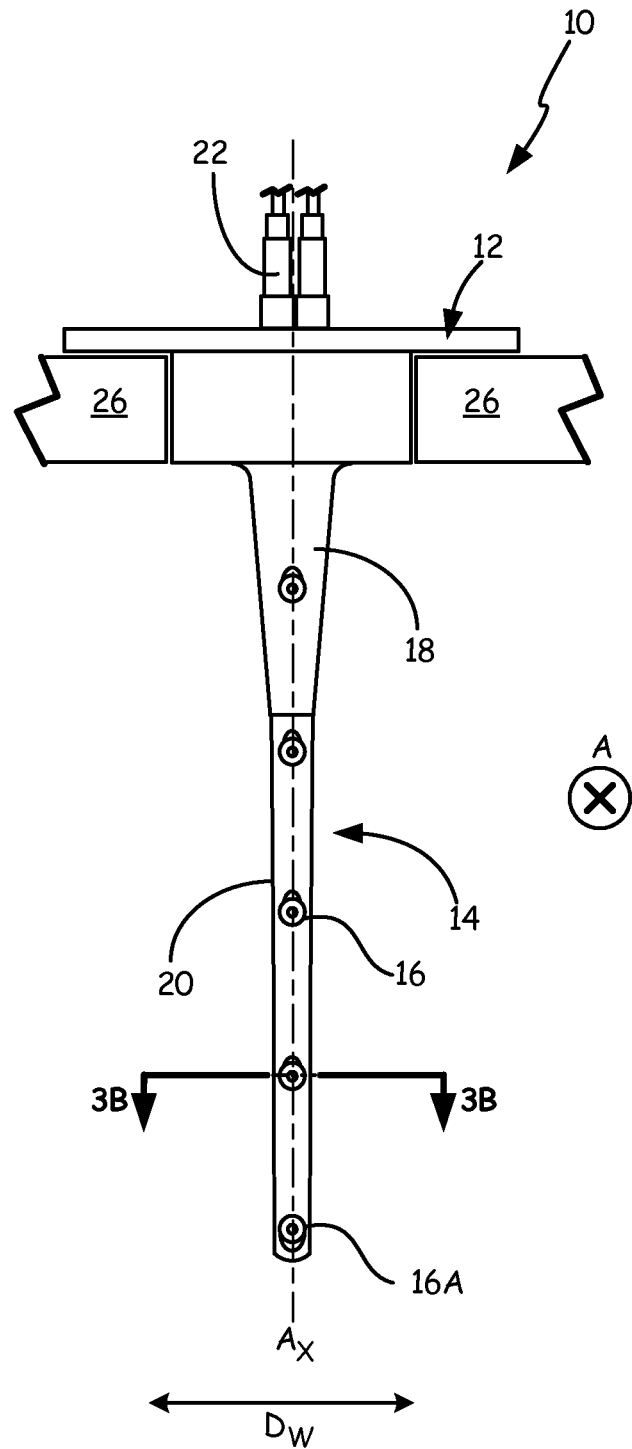

Base 12 supports the rest of pressure probe 10 and engages with a surrounding duct 26 (as shown in FIGS. 2A-2B) in order to minimize losses of pressurized air at the location where pressure probe 10 enters the duct. As shown in FIG. 1, base 12 is a substantially annular structure with a flange. Base 12 includes internal channels 24, which fluidically connect kiels 16 to hypo tubing 22.

Airfoil 14 extends from base 12 along primary axis $A_X$. Airfoil 14 is made of a metal, such as a high temperature superalloy, and airfoil 14 also contains internal channels 24. Airfoil 14 is non-deflecting, in that it is configured to minimally disrupt airstream A, as previously discussed. Kiels 16 extend from airfoil 14 in the upstream direction of airstream A. Kiels 16 are arranged in the direction of an expected airstream direction. As shown in FIG. 1, the expected direction of airstream A (and, thus, the direction in which kiels 16 are arranged) is roughly perpendicular to primary axis $A_x$.

Along primary axis $A_x$ from base 12, airfoil 14 first includes tapered portion 18 and then linear portion 20. Tapered portion 18 is a relatively thicker and structurally stronger than linear portion 20, and tapered portion 18 connects linear portion 20 to base 12. At tapered portion 18, airfoil 14 tapers along both its chord dimension $D_C$ and its width dimension $D_W$. In the embodiment shown in FIG. 1, chord dimension $D_C$ is 8% less at the intersection of tapered portion 18 and linear portion 20 than it is at the intersection of tapered portion 18 and base 12. Furthermore, width dimension $D_W$ is 20% less at the intersection of tapered portion 18 and linear portion 20 than it is at the intersection of tapered portion 18 and base 12. Because tapered portion 18 is thicker than linear portion 20 both in chord direction $D_C$ and width direction $D_W$, tapered portion 18 is capable of supporting substantial loads applied to the entirety of airfoil 14 by airstream A.

Hypo tubing 22 is arranged on the opposite side of base 12 from airfoil 14. Hypo tubing 22 can route air sampled from airstream A to a remote sensor (not shown). In some cases, such remote sensors can facilitate measurement of useful information by maintaining a fluid communication path between one of kiels 16 and a remote sensor (not shown), as previously described. For example, a pressure sensor may not require actual air samples, but merely a fluidic connection via hypo tubing 22 to one of kiels 16 and airstream A.

Internal tubing 24 is shown in phantom. In alternative embodiments, internal tubing 24 may be routed (e.g., by coiling) as it passes between some of kiels 16 and hypo tubing 22 such that each internal tubing 24 has an equal length with the others. In this way, variation in samples that is dependent on the distance the sample travels through airfoil 14 can be managed or eliminated.

Pressure probe 10 is additively manufactured, such that kiels 16 are monolithically formed with airfoil 14. For example, pressure probe 10 may be manufactured using Direct Metal Laser Sintering. Monolithically forming kiels 16 with airfoil 14 eliminates an extra step in manufacturing, and eliminates the need for fittings, as well as eliminating a potential source of leaks between the inlet of kiels 16 and remote sensors (not shown). Furthermore, kiels 16 may be accurately aligned with the specific airstream A that is expected to pass by pressure probe 10. Kiels 16 that are monolithically formed with airfoil 14 exhibit relatively low drag and a minimal cross-section facing airstream A. Airfoil 14 also has a minimal cross-section facing airstream A (as described in more detail with respect to FIG. 2B), and is designed to be non-deflecting, i.e., to impart negligible force on airstream A.

In alternative embodiments, pressure probe 10 may be shaped differently in order to be non-disruptive to the airstream for which it was designed. For example, pressure probe 10 may follow a non-linear primary axis $A_x$ that is curved, angled, or twisted to orient kiels 16 in the expected direction of airstream A.

Furthermore, base 12 may be shaped differently in alternative embodiments in order to engage with various duct openings. Probe body 14 may be made of various materials in alternative embodiments. For example, in low temperature environments, probe body 14 need not be made of a high temperature super-alloy, but may instead be made of a metal alloy or a polymer. Pressure probe 10 may not always be positioned within airstream A. In some embodiments, pressure probe 10 is positioned within airstream A only during engine conditions when measurements are desired, such as during startup. During other engine conditions, pressure probe 10 can be retracted from airstream A.

In some embodiments, kiels 16 may face in different directions from one another depending on the expected direction of airstream A. For example, where airstream A includes voracity or rotation, such that the expected direction of airstream A varies, kiels 16 may be configured such that they do not all face in the same direction, but rather in the direction of airstream A at that location along airfoil 14. As shown in FIG. 1, kiel 16A faces in a different direction from the other kiels 16. In some embodiments, pressure probe 10 may be a Mach probe, as described in more detail with respect to the embodiment shown in FIGS. 4A-4B.

FIGS. 2A-2B illustrate pressure probe 10 of FIG. 1 from the upstream end and the side, respectively. Furthermore, FIGS. 2A-2B illustrate the interaction of duct 26 with pressure probe 10.

FIG. 2A is a partial cross-sectional view that illustrates pressure probe 10 of FIG. 1. Pressure probe 10 is shown as previously described with respect to FIG. 1. In the view shown in FIG. 2A, airfoil 14 is shown in planform. FIG. 2A further illustrates base 12 engaged with duct 26, which is shown in cross-section. Duct 26 is a wall that contains airstream A. For example, in one embodiment, duct 26 may be a composite duct containing the core airflow of a gas turbine engine. Often, duct 26 forms a closed annular structure. FIG. 2A includes cross-section 3A-3A, as further described with respect to FIG. 3A.

As shown in FIG. 2A, airstream A is contained by duct 26, and passes by airfoil 14 and kiels 16. Kiels 16 are arranged to face in an expected direction of oncoming airflow that forms airstream A. Base 12 is configured to engage with duct 26 to prevent egress of airstream A.

FIG. 2B is a partial cross-sectional view that also illustrates pressure probe 10 of FIG. 1. FIG. 2B shows pressure probe 10 from the perspective of the oncoming airstream A. As shown in FIG. 2B, the cross-sectional area of airfoil 14 as seen from this perspective is minimized. Furthermore, it is apparent from FIG. 2B that airfoil 14 does not deflect airstream. As illustrated in FIG. 2B, airfoil 14 has no camber, and its angle of attack within airstream is zero.

In alternative embodiments, airfoil 14 may have camber or curvature depending on the expected direction of airstream A. While the direction of airstream A may vary depending on flight phase, airfoil 14 is designed to minimize the amount of deflection of airstream A. This design is desirable in those sensing applications where deflection of airstream A is unnecessary, and drag on airstream A is undesirable.

Figure 3A:
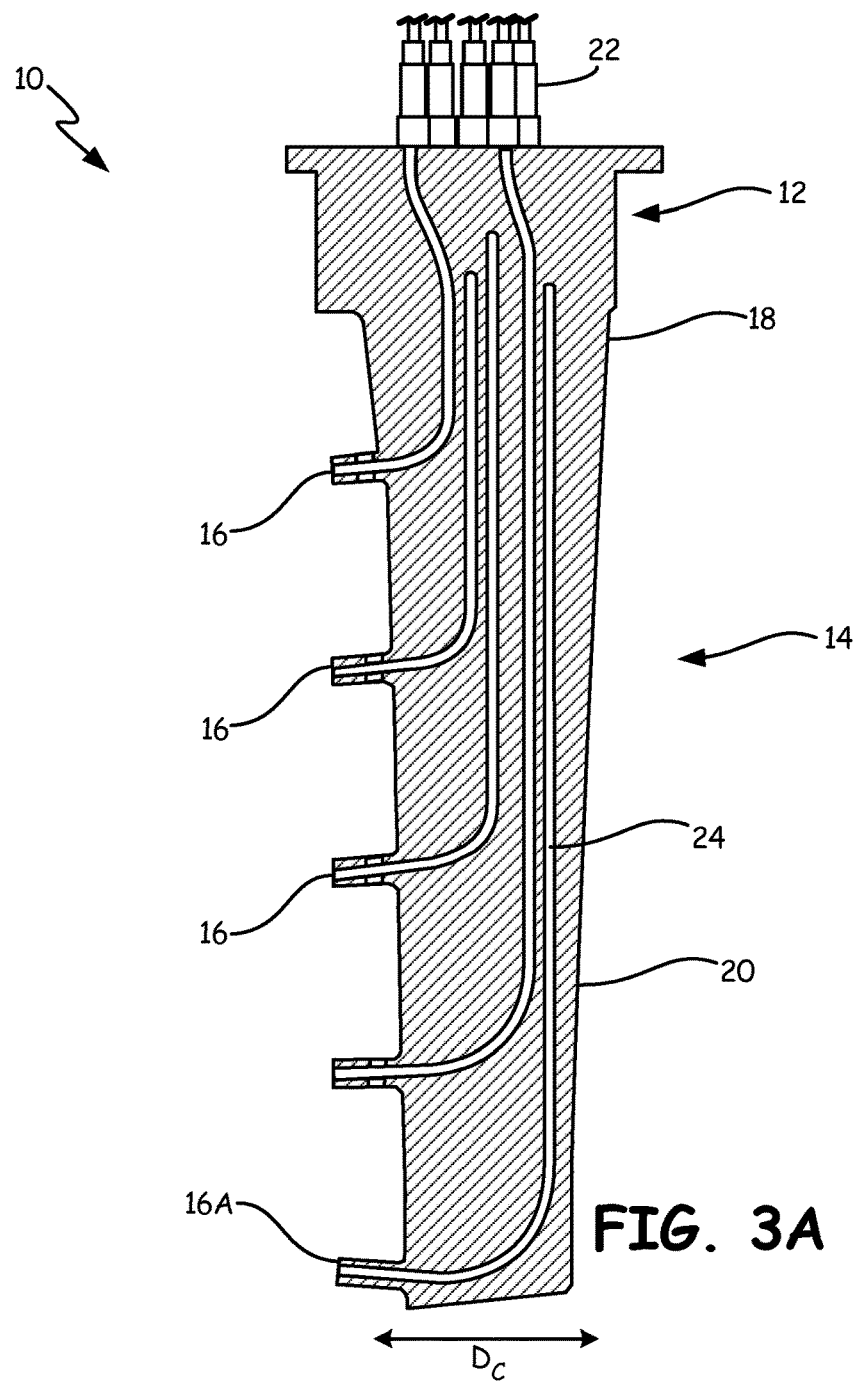
FIGS. 3A-3B are a cross-sectional views of the pressure probe of FIG. 1, taken along lines 3A-3A and 3B-3B, respectively.

FIG. 3A is a cross-sectional view of pressure probe 10, taken along line 3A-3A of FIG. 2A. As previously described with respect to FIG. 1, pressure probe 10 includes base 12, airfoil 14, and kiels 16. Airfoil 14 includes tapered portion 18 and linear portion 20. FIG. 3A also illustrates internal channels 24, which pass through base 12 and airfoil 14 in order to fluidically connect kiels 16 with hypo tubing 22.

As shown in FIG. 3A, internal channels 24 pass through the interior of airfoil 14 and base 12. By routing internal channels 24 through the interior of airfoil 14, disruption of airstream A is minimized Additively manufacturing pressure probe 10 allows for highly complex internal passages 24. For example, in some alternative embodiments, internal passages 24 of pressure probe 10 may be non-linear passageways that include serpentine sections, such that internal passages 24 each have an equal length to one another. Thus, pressure drop caused by internal passages 24 can be standardized between kiels 16 and hypo tubing 22.

Figure 3B:
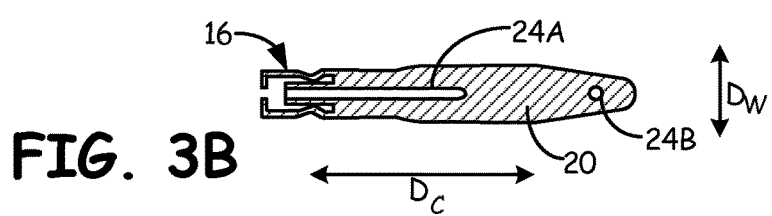

FIG. 3B is a cross-sectional view of pressure probe 10, taken along section 3B-3B of FIG. 2B, passing through linear portion 20. In the cross-section shown in FIG. 3B, kiel 16 is bisected to show first internal passage 24A passing through it. The cross-section shown in FIG. 3B further shows second internal passage 24B, which traverses a path between kiel 16A (FIG. 3A) and base 12 (FIG. 3A).

Figure 4:
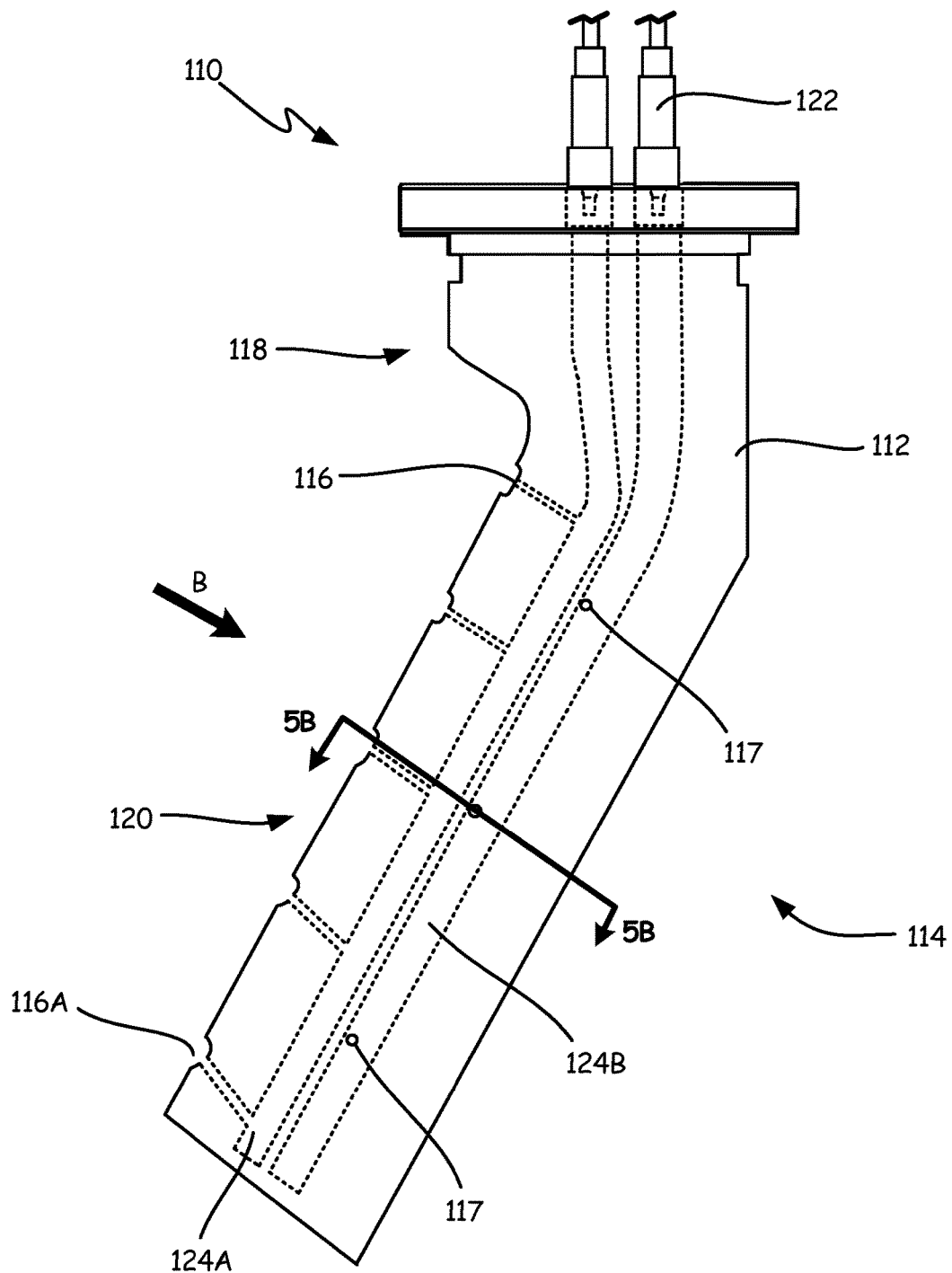
FIG. 4 is a schematic view of a Mach probe, with internal tubing shown in phantom.

FIG. 4 is a schematic view of Mach probe 110 within airstream B. Mach probe includes base 112, airfoil 114, and kiels 116, as previously described with respect to FIG. 1. Slight differences in the structures exist based on the different technical requirements of a Mach probe from a pressure probe. For example, kiels 116 comprise a cutout portion of the leading edge of airfoil 114, rather than a superstructure built onto that edge as shown with respect to the pressure probe of FIG. 1. Mach probe 110 also includes side ports 117, which route samples of airstream B from the center (chordwise) of the planform of airfoil 114 to a remote sensor (not shown). Airfoil 114 includes tapered portion 118 and linear portion 120. Mach probe 110 is coupled with hypo tubing 122, which is used to route information regarding airstream B to remote sensors (not shown), such as plasma flow sensors, pressure sensors, and/or temperature sensors.

Figure 5A:
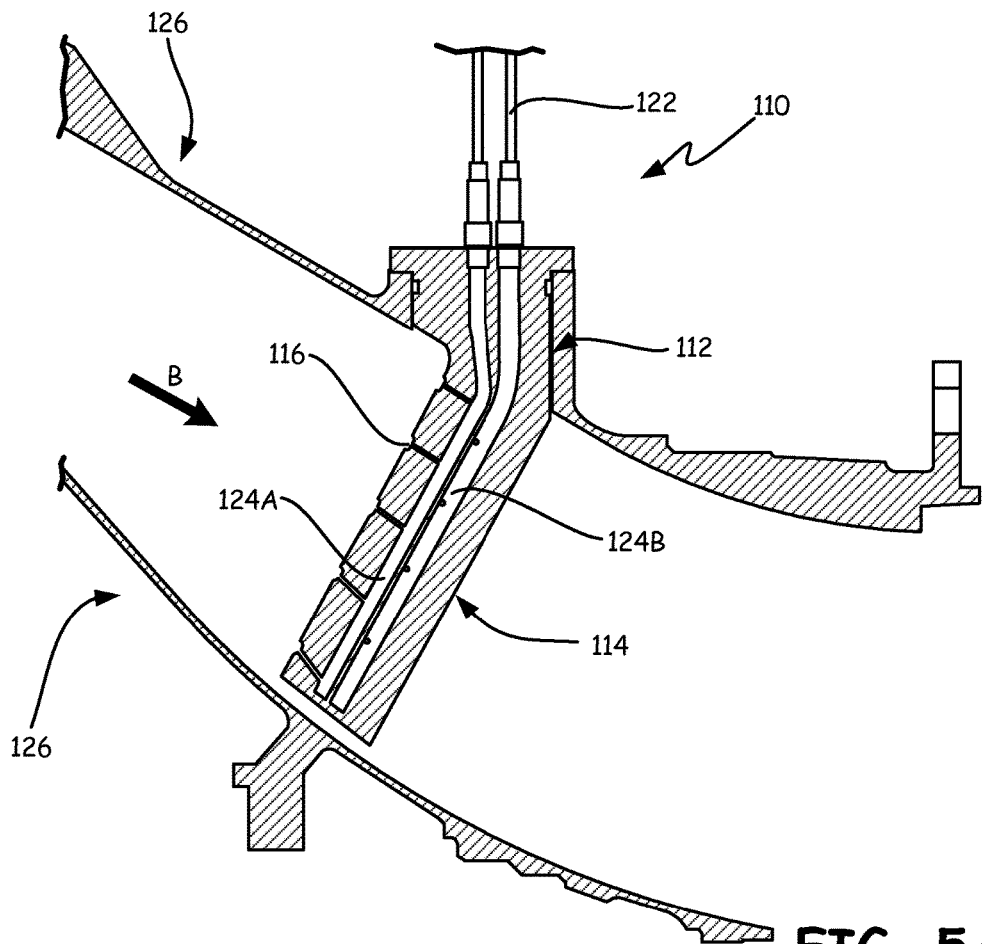
FIG. 5A is a cross-sectional view of the Mach probe of FIG. 4.

Mach probe 110 is similar to pressure probe 10, and is used to determine a Mach number of the aircraft. Mach probe 110 is configured to be placed in duct 126 (FIG. 5A). Mach probes generally must be aligned with the flow path in order to prevent false Mach number readings. Additively manufacturing Mach probe 110 allows for internal passages 124 (FIG. 4B) that are non-linear, such that Mach probe 110 may also be non-linear. Mach probes typically route air from both the leading edge of airfoil 114 and the center (chordwise) of the planform of airfoil 114. Samples of each portion of airstream B are routed in separate tubes from one another. However, several kiels 116 each feed the same internal tube 124A, and each of side ports 117 feed the same internal tube 124B. Accordingly, Mach probe 110 may be oriented within the flow path of airstream B.

Non-linear Mach probes such as Mach probe 110 are capable of generating highly accurate Mach number readings, as well as minimizing inefficiencies and downstream wakes, as previously discussed with reference to the pressure probe of FIG. 1. Additively manufacturing Mach probe 110 allows for built-in internal passages, which may be non-linear and allow for orientation of Mach probe 110 with the flow path of airstream B.

FIG. 5A is a cross-sectional view of Mach probe 110. FIG. 5A illustrates how Mach probe 110 is configured to fit within duct 126. Mach probe 110 and duct 126 engage to prevent egress of airstream B from duct 126.

Figure 5B:
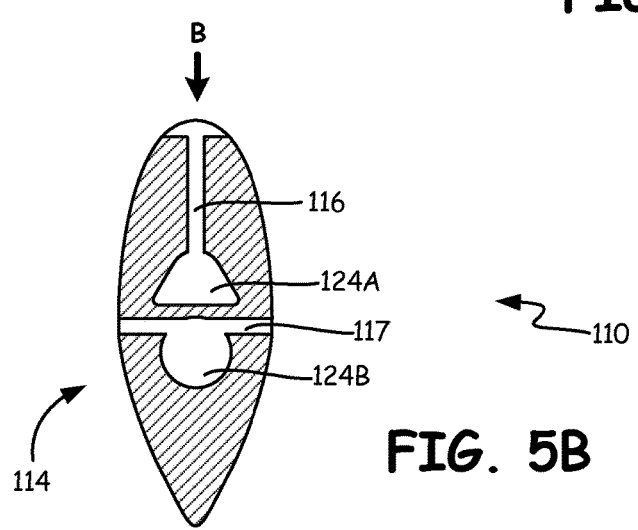
FIG. 5B is a cross-sectional view of the Mach probe of FIG. 4 taken across line 5B-5B.

FIG. 5B is a cross-sectional view of Mach probe 110 of FIG. 4, illustrating tubing 124A for the portion of airstream B routed from the leading edge of airfoil 114 via kiels 116. Side ports 117 are configured to route air from the center (chordwise) of the planform of airfoil 114 to a second tubing 124B.

FIG. 5B illustrates another benefit of additively manufacturing Mach probe 110. As shown in FIG. 5B, the cross-section of tubing 124A is nearly triangular. Although this particular shape of tubing 124A is beneficial in many applications, various other cross-sections are possible. Further, tubing 124B, kiels 116, and/or side ports 117 may have various shapes or cross-sections that were previously difficult or impossible to create, using traditional subtractive manufacturing techniques. Such patterns can be used to promote or inhibit laminar flow, or to increase or decrease pressure drop from kiels and/or side ports 117 to remote sensors. In alternative embodiments, it is possible to create internal tubing 124A and/or 124B that is non-uniform in shape and/or cross-sectional area at different locations along the length of airfoil 114.

DISCUSSION OF POSSIBLE EMBODIMENTS

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. The following are non-exclusive descriptions of possible embodiments of the present disclosure.

A pressure probe includes a non-deflecting airfoil made of a metal and configured for use in a gas turbine engine, the airfoil extending from a base to a tapered portion to a linear portion along a primary axis. A sensing feature is monolithically formed with the airfoil. An interior passage is operatively connected to the sensing feature and passing through both the airfoil and the base.

The pressure probe of the preceding paragraph can optionally include additionally and/or alternatively, any one or more of the following features, configurations and/or additional components.

The sensing feature may be a kiel. The kiel may be oriented to face in an expected airstream direction. Each of the interior passages may have an equal passage length. At least one of the plurality of kiels may face in a different direction from others of the plurality of kiels.

Each of the plurality of interior passages may pass through the base. The airfoil may include a chord dimension and a width dimension that vary along the primary axis. For example, the chord dimension may be 8% less at the intersection of the tapered portion and the linear portion than at the intersection of the tapered portion and the base. Additionally or alternatively, the width dimension may be 20% less at the intersection of the tapered portion and the linear portion than at the intersection of the tapered portion and the base.

The base may be configured to be coupled to a plurality of hypo tubes.

A method of making a pressure probe includes selectively sintering layers of a metal feedstock powder into a pressure probe having a plurality of internal passageways, each of the plurality of internal passageways having an equal length. The method further includes selectively sintering the layers of the metal feedstock powder into a plurality of kiels that are monolithically formed with the pressure probe, wherein each of the kiels are fluidically connected to one of the plurality of internal passageways.

The method of the preceding paragraph can optionally include additionally and/or alternatively, any one or more of the following features, configurations and/or additional components.

Selectively sintering may include direct metal laser sintering. The pressure probe may include a non-deflecting airfoil.

A Mach probe includes a Mach probe body made of a metal and configured for use in a gas turbine engine. The Mach probe body extends from a base along a non-linear primary axis. A plurality of sensing features are monolithically formed with the Mach probe body. A plurality of interior passages are operatively connected to the sensing features. Each of the plurality of interior passages has an equal length with the others.

The Mach probe of the preceding paragraph can optionally include additionally and/or alternatively, any one or more of the following features, configurations and/or additional components.

Each of the plurality of sensing features may be a kiel. Each of the plurality of kiels may face in the direction of an expected airstream. At least one of the kiels may face in a different direction from the others of the plurality of kiels.

The invention claimed is:

1. A pressure probe comprising:
    a non-deflecting airfoil made of a metal and configured for use in a gas turbine engine, the airfoil extending from a base to a tapered portion to a linear portion along a primary axis;
    a plurality of kiels, each kiel monolithically formed with the airfoil; and
    a plurality of interior passages, each interior passage operatively connected to a different one of the kiels and passing through both the airfoil and the base, wherein the interior passages have equal passage lengths.

2. The pressure probe of claim 1, wherein the kiel is oriented to face in an expected airstream direction.

3. The pressure probe of claim 1, wherein each of the plurality of interior passages passes through the base.

4. The pressure probe of claim 1, wherein the airfoil includes a chord dimension and a width dimension that vary along the primary axis, such that:

the chord dimension is 8% less at the intersection of the tapered portion and the linear portion than at the intersection of the tapered portion and the base; and the width dimension is 20% less at the intersection of the tapered portion and the linear portion than at the intersection of the tapered portion and the base.

5. The pressure probe of claim 1, wherein the base is configured to be coupled to a plurality of hypo tubes.

6. The pressure probe of claim 1, wherein at least one of the plurality of kiels faces in a different direction from others of the plurality of kiels.

7. A method of making a pressure probe, the method comprising:

selectively sintering layers of a metal feedstock powder into a pressure probe having a plurality of internal passageways, each of the plurality of internal passageways having an equal length; and selectively sintering the layers of the metal feedstock powder into a plurality of kiels that are monolithically formed with the pressure probe, wherein each of the kiels are fluidically connected to one of the plurality of internal passageways.

8. The method of claim 7, wherein selectively sintering includes direct metal laser sintering.

9. The method of claim 7, wherein the pressure probe includes a non-deflecting airfoil.

10. A Mach probe comprising:

a Mach probe airfoil made of a metal and configured for use in a gas turbine engine, the Mach probe airfoil extending from a base along a non-linear primary axis;

a plurality of sensing features monolithically formed with the Mach probe airfoil; and a plurality of interior passages, wherein each of the plurality of sensing features is operatively connected to a different one of the plurality of interior passages, and the plurality of interior passages have equal lengths.

11. The Mach probe of claim 10, wherein each of the plurality of sensing features comprises a kiel.

12. The Mach probe of claim 10, wherein each of the plurality of kiels faces in a direction of an expected airstream.

13. The Mach probe of claim 10, wherein at least one of the kiels faces in a different direction from the others of the plurality of kiels.

* * * * *